United States Patent [19]

Terpstra et al.

[11] 4,367,665
[45] Jan. 11, 1983

[54] SAWDUST COLLECTION SYSTEM

[75] Inventors: Daniel A. Terpstra, Kirkwood; Richard B. Brundage, Ladue, both of Mo.

[73] Assignee: Emerson Electric Co., St. Louis, Mo.

[21] Appl. No.: 217,950

[22] Filed: Dec. 19, 1980

[51] Int. Cl.$^3$ .............................. B27B 5/16; B27B 5/29
[52] U.S. Cl. ........................................ 83/100; 83/167; 83/473; 83/478
[58] Field of Search ................. 83/100, 167, 473, 478; 51/273; 144/252 R, 252 A

[56] References Cited

U.S. PATENT DOCUMENTS

| Re. 20,687 | 4/1938 | Grozier | 83/100 |
|---|---|---|---|
| 1,496,035 | 6/1924 | Thomson | 83/100 |
| 2,044,481 | 6/1936 | Manley et al. | 144/252 R |
| 2,236,232 | 3/1941 | Brescka et al. | 51/273 |
| 2,711,061 | 6/1955 | Fegert | 51/273 |
| 3,007,501 | 11/1961 | Mundall et al. | 144/252 R |
| 3,267,974 | 8/1966 | Elson | 83/100 |
| 3,322,169 | 5/1967 | Hilliard | 83/100 |
| 3,401,724 | 9/1968 | Krietz | 83/100 |
| 3,669,163 | 6/1972 | Crane | 83/100 |
| 4,201,256 | 5/1980 | Truhan | 83/100 X |
| 4,270,427 | 6/1981 | Colberg et al. | 83/473 |

FOREIGN PATENT DOCUMENTS 501042  6/1930  Fed. Rep. of Germany ........ 83/100

Primary Examiner—James M. Meister
Attorney, Agent, or Firm—Charles E. Markham

[57] ABSTRACT

A belt driven table saw having a open bottom base below the worktable enclosing saw tilting and elevating mechanism and a driving motor mounted outboard of the base has a sawdust collector bag detachably connected to and closing the bottom of the base for collecting downwardly directed sawdust, a centrifugal blower having a casing fixed to the motor and an impeller therein fixed to the motor shaft withdraws fine sawdust from a hinged saw guard and from the base through flexible conduits and discharges it into a second collector bag attached to the blower outlet, a swinging baffle plate and suitable foam rubber sealing means permits maintaining a subatmospheric pressure in the base.

14 Claims, 19 Drawing Figures

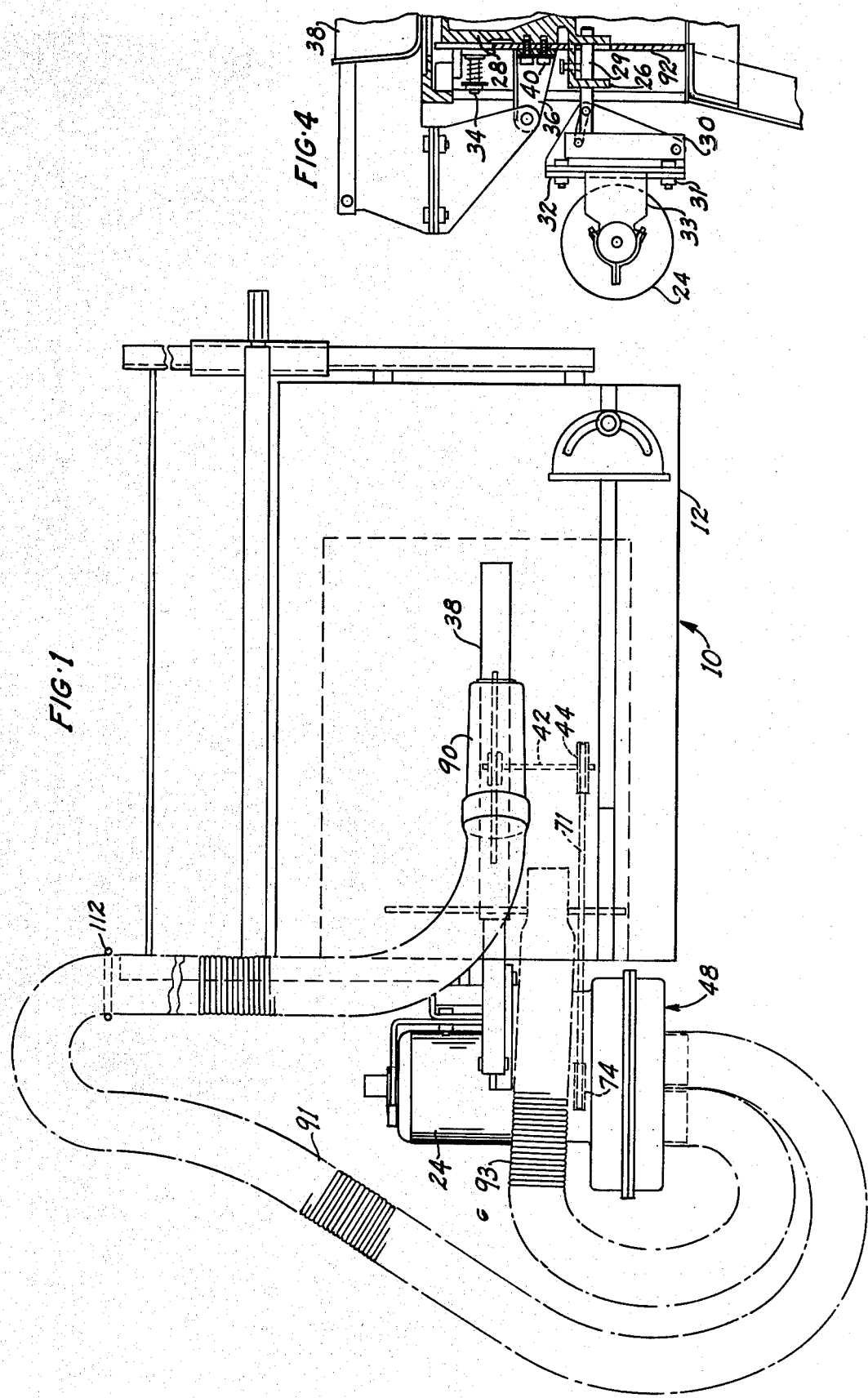

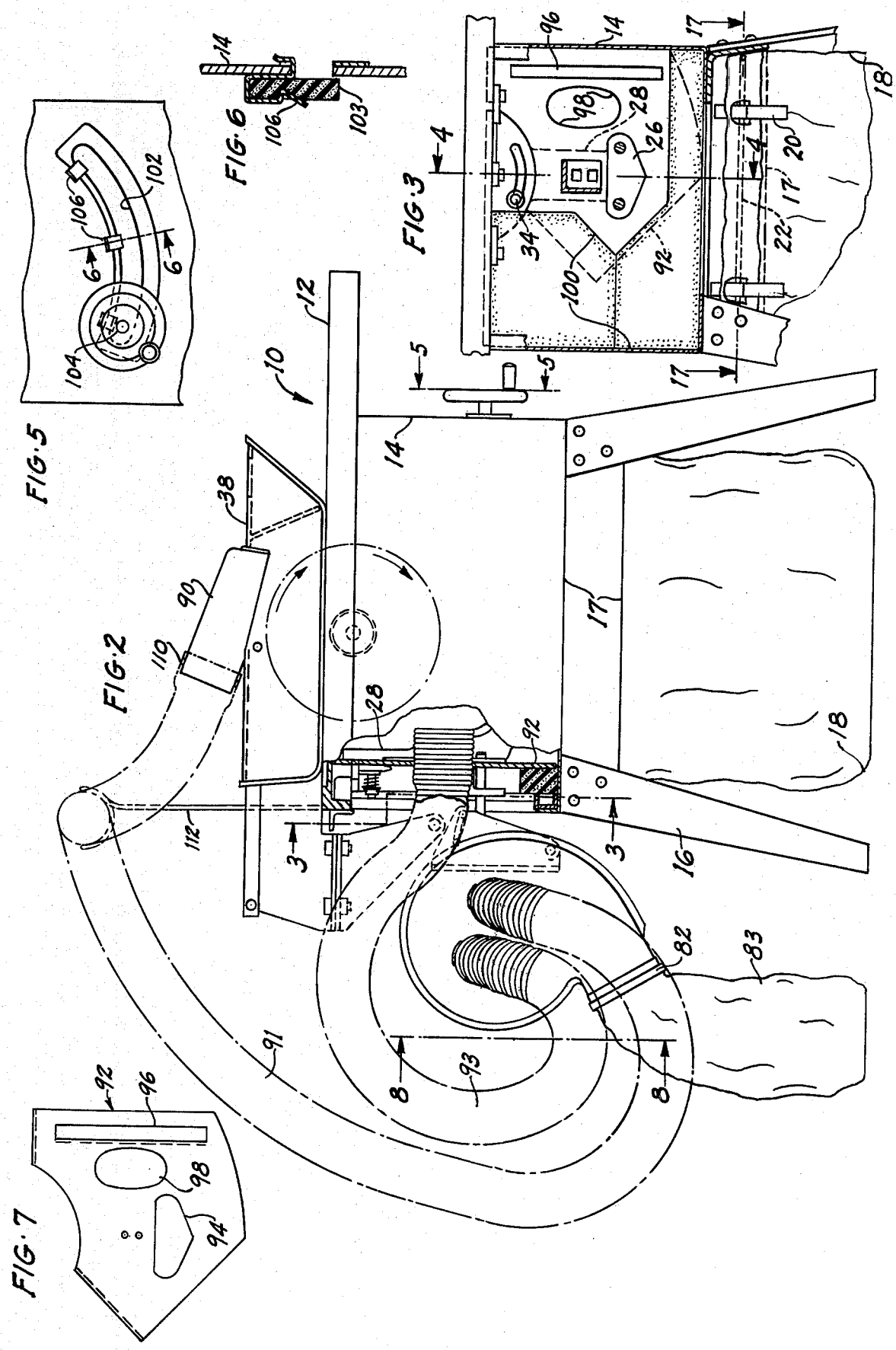

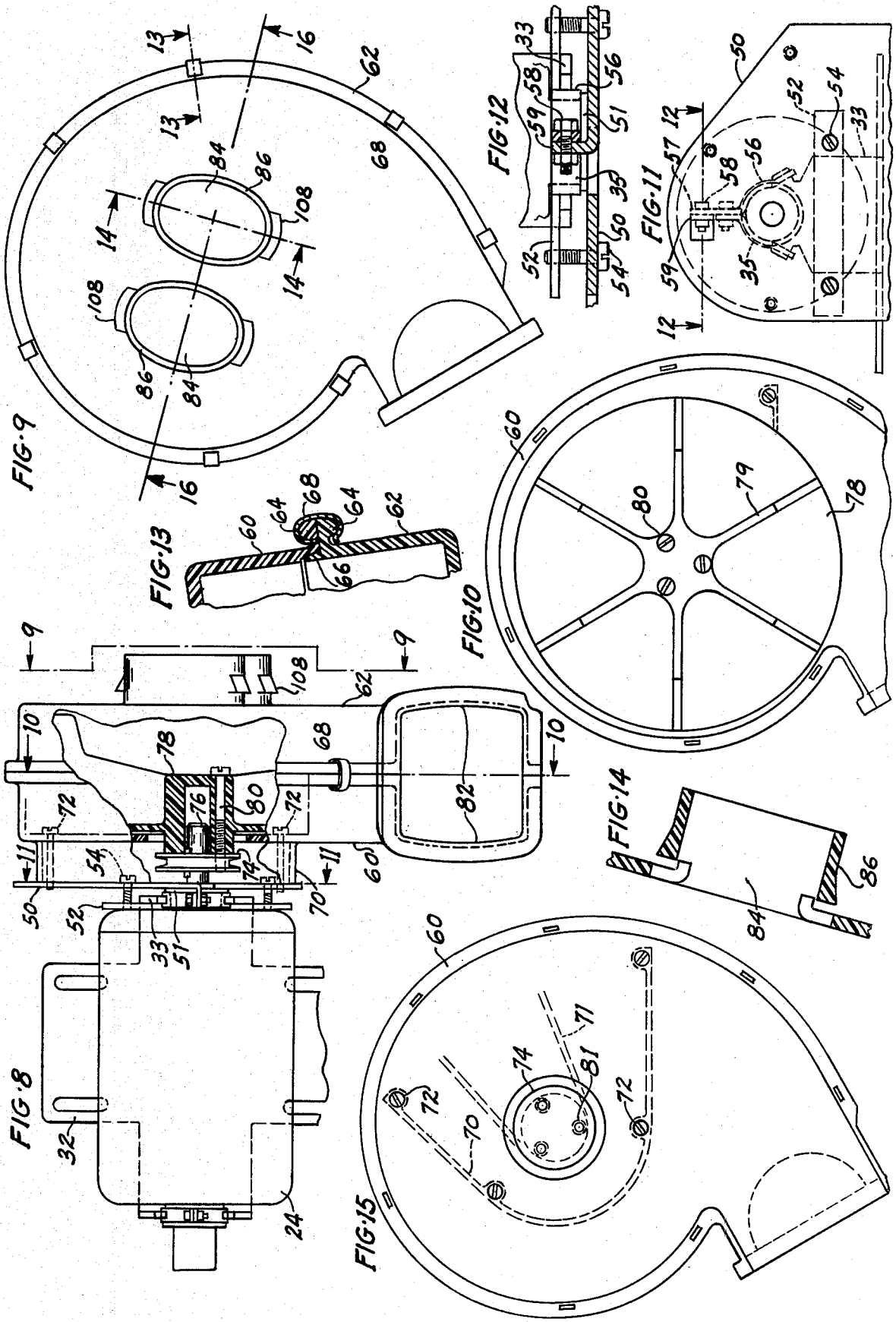

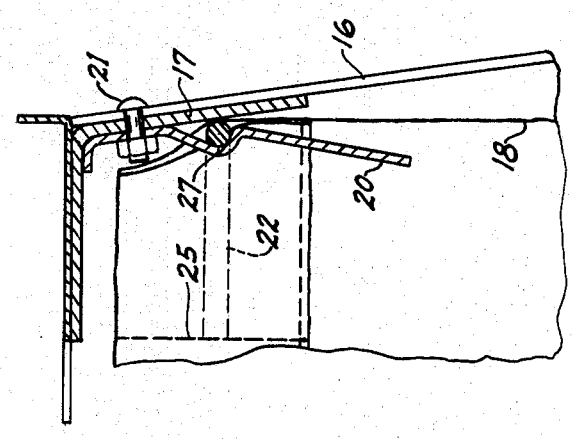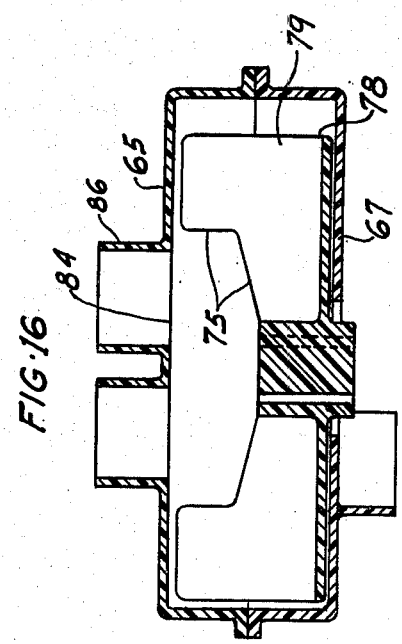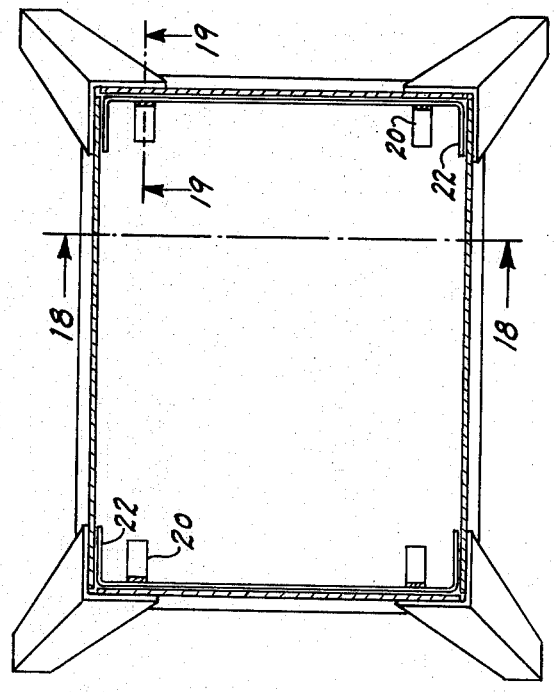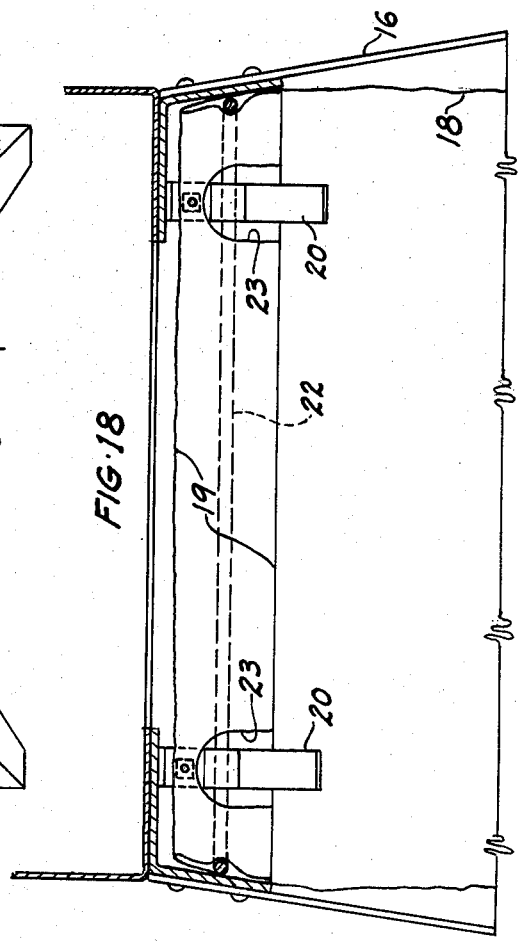

SAWDUST COLLECTION SYSTEM

This invention relates to systems and apparatus for collecting sawdust produced by power saws including means for collecting fine sawdust likely to become airborne and drift to remote areas. While the illustrated embodiment is adapted to collect virtually all sawdust produced in the operation of a particular type of table saw, elements of the apparatus are adaptable to some other types of power saws.

BACKGROUND OF THE INVENTION

Of the sawdust produced in the operation of power saws the heavier, larger particles are thrown in some more or less finite direction by the saw blade and may be collected in a suitably positioned receptacle while fine particles thereof become airborne to be inhaled by the operator or drift with air currents to eventually accumulate in areas remote from the workshop. When the workshop is located in a residence accumulations of fine sawdust remote from the workshop becomes a major problem.

The volume of fine sawdust particles likely to become airborne is quite small compared to the volume of larger heavier particles produced in sawing so that the capacity of means for collecting only these finer particles may be made commensurate. When a centrifugal blower is employed to provide a vacuum for collecting only these finer sawdust particles from confined areas wherein both fine and larger, heavier sawdust particles are present it is essential to determine a discriminating airflow speed through these areas. Too high an airflow speed will of course load the blower and collecting receptacle with the larger, heavier particles which may readily be collected by other means also, in some instances a high airflow rate may draw into the blower larger pieces of the wood being sawed thereby clogging the blower. Centrifugal blower means and its connections with these confined areas which will result in an airflow speed through these areas just sufficient to collect only the finer particles of sawdust is a feature of this invention.

OBJECTS OF THE INVENTION

The primary object of this invention is to provide a generally new and improved sawdust collection system for a stationary power saw capable of collecting virtually all sawdust produced in the operation thereof including those particles fine enough to become readily airborne.

A further object is to provide a stationary motor driven power saw with a centrifugal blower mounted on and driven by the saw driving motor for collection of sawdust.

A further object is to provide a sawdust collection system in which a smaller volume of lighter sawdust particles produced in sawing is collected by vacuum means and deposited in a receptacle and in which a larger volume of larger, heavier sawdust particles are collected in a second receptacle placed in their line of travel from the saw blade.

A further object is to provide sawdust collection apparatus adapted to be assembled on a belt driven table saw having an outboard mounted driving motor.

A further object is to provide centrifugal blower means driven by the saw driving motor of a table saw for withdrawing fine sawdust from the saw blade guard and collecting it.

A further object is to provide centrifugal blower means driven by the saw driving motor of a table saw for withdrawing fine sawdust from the saw guard and from the base below the worktable enclosing saw tilting and elevating mechanism.

A further object is to provide a collector bag positioned below the worktable of a table saw for collecting downwardly directed sawdust with means for conveniently detachably connecting the bag to a base below the table enclosing saw tilting and elevating mechanism.

A further object is to provide a sawdust collection system for a belt driven table saw having a saw guard, a base below the worktable enclosing saw tilting and elevating mechanism and a driving motor mounted outboard of the base which includes a centrifugal blower fixed to and driven by the motor and flexible conduit means connecting the saw guard and base to the inlet of the blower.

A further object is to provide means for sealing the saw base to permit maintaining a subatmospheric pressure therein by the centrifugal blower.

THE DRAWINGS

FIG. 1 is a plan view of a belt driven table saw with an outboard mounted driving motor on which the elements of a sawdust collection system constructed in accordance with the invention are assembled;

FIG. 2 is a side elevational view of the table saw and sawdust collection system shown in FIG. 1;

FIG. 3 is a fragmentary elevational view of the rear side of table saw with parts shown in section and is taken along line 3—3 of FIG. 2;

FIG. 4 is a fragmentary cross-sectional view taken along line 4—4 of FIG. 3;

FIG. 5 is a fragmentary elevational view of the front side of the saw base and is taken along line 5—5 of FIG. 2;

FIG. 6 is a cross-sectional view taken along line 6—6 of FIG. 5;

FIG. 7 is an elevational view of the swinging baffle plate shown alone;

FIG. 8 is an enlarged elevational view of the driving motor and attached centrifugal blower with parts shown in section and is taken along line 8—8 of FIG. 2;

FIG. 9 is an elevational view of the centrifugal blower and is taken along line 9—9 of FIG. 8;

FIG. 10 is an elevational view of one half of the blower casing showing the impeller therein and is taken along line 10—10 of FIG. 8;

FIG. 11 is a fragmentary elevational view of the blower mounting plate and is taken along line 11—11 of FIG. 8;

FIG. 12 is an enlarged cross-sectional view taken along line 12—12 of FIG. 11.

FIG. 13 is a fragmentary cross-sectional view showing the method of attaching the two halves of the blower casing and is taken along line 13—13 of FIG. 9;

FIG. 14 is an enlarged fragmentary cross-sectional view of the blower inlet collars and is taken along line 14—14 of FIG. 9;

FIG. 15 is an elevational view of the connected half of the blower casing shown in FIG. 10 with the impeller removed.

FIG. 16 is a cross-sectional view of the blower taken along line 16—16 of FIG. 9;

FIG. 17 is a cross-sectional plan view taken along line 17—17 of FIG. 3;

FIG. 18 is an enlarged fragmentary cross section taken along line 18—18 of FIG. 17; and FIG. 19 is a further enlarged fragmentary cross section taken along line 19—19 of FIG. 17.

DESCRIPTION OF A PREFERRED FORM OF THE INVENTION

Referring to FIGS. 1 to 5 of the drawings the elements of the sawdust collection system are shown assembled on a current commercially available belt driven table saw generally indicated at 10. The table saw has a worktable 12, a base 14, rectangular in plan, forms a casing enclosing saw tilting and elevating mechanism and a leg set 16 including a skirt 17 suitably attached to the bottom of the base. The bottom of base 14 is open and a collector bag 18 of suitable material closing the open bottom is detachably connected at its open end to the skirt 17 by elongated vertically extending clips 20 attached to the skirt on opposite sides of the base by bolts 21, see FIGS. 17, 18 and 19. The open end of the collector bag 18 is hemmed at 19 and rods 22 are inserted in the hem through cutouts 23 therein.

End portions of rods 22 are formed at 90 degrees and the rods are arranged in the hem so as to hold the open end thereof in a generally rectangular shape with a pair of hem cutouts 23 on opposite sides thereof. Cross-stitching closes the hem at points 25 thereby to maintain the rods in proper position. The elongated vertically arranged clips 20 are attached at their upper ends to the inner surface of skirt 17 by the bolts 21 and have substantially the same spacing as hem cutouts 23. Clips 20 are formed so as to provide a rod receiving notch 27 immediately below their point of attachment. Downwardly from notch 27 the clips 20 are formed so as to flare outwardly from the inner surface of skirt 17 thereby to provide easy entry of rods 22 into notches 27.

In mounting bag 18 the open end is positioned so that cutouts 23 are aligned with clips 20. The bag is then moved upward with the flared lower portions of the clips passing through cutouts 23 and over those portions of the rods 22 extending across the cutouts. Further upward movement enters those rod portions into notches 27 whereby the bag is resiliently retained with the lower flared ends of clips 20 extending inside the bag. It will be understood that the bag 18 may be attached directly to the walls of base 14 in this manner instead of to the skirt 17. Also the bag may be attached in this manner to the walls defining any rectangular port for collecting waste material.

The rear side of base 14 is also substantially open and the driving motor 24 is mounted outboard of the rear side of the base on a lower portion 26 of a swinging member 28 by rods 29 of an adjustable bracket 30 and by a motor mounting bracket 32 connected to adjustable bracket 30 by bolts 31, see FIG. 4. Hub portions 51 of the motor casing are cradled in turned up end portions 33 of mounting bracket 32 and are attached thereto by conventional clamps 35, see FIGS. 8, 11 and 12. The member 28 swings on trunnions at its upper end (not shown) and is fixed in angular position by suitable clamping means. A support bracket 36 supporting a hinged saw guard 38 is also attached to the swinging member 28 by screws 40 and a shaft 42 on which a driven belt pulley 44 and circular saw blade 46 are mounted is journalled in swinging member 28. The driving motor, pulleys, belt, saw blade and saw guard all swing with member 28 in attaining bevel positions of the saw blade.

A centrifugal blower generally indicated at 48 is attached to one of the turned up end portions 33 of the motor mounting bracket 32 by a mounting plate 50 and a bar 52 which are connected by screws 54, see FIGS. 8, 11 and 12. The bar 52 bears against the inside of turned up portion 33 and the mounting plate 50 bears against a hub portion 51 of the motor casing and in spaced relationship with the outside of portion 33. The mounting plate 50 is also connected to the hub portion 51 of the motor casing via a special mounting clamp 56. Clamp 56 differs from conventional clamps 35 only in that it has a vertically elongated portion 57 to which a punched out and formed tab portion 59 of the mounting plate 50 is attached by a bolt 58, see FIGS. 11 and 12.

The blower 48 has a casing formed of two halves 60 and 62 having front and rear walls 65 and 67 respectively and each having meeting flanges 64 and overlapping portions 66. The halves 60 and 62 are joined by clips 68, see FIG. 13. The casing half 60 has an integral skirt 70 projecting from its closed end which bears against and is connected to mounting plate 50 by screws 72. A V-belt drive pulley 74 is keyed to the motor output shaft 76 and positioned axially thereon intermediately of the wall 67 of blower casing half 60 and the mounting plate 50. The skirt 70, see FIG. 15, is shaped to form a guard for pulley 74 and drive belt 71.

A circular impeller 78 within the blower casing has a hub portion connected to the drive pulley 74 by screws 80 entered into tapped holes 81 in the pulley 74, see FIGS. 8, 10 and 15. The blower casing has volute form with a flanged outlet 82 and a pair of elliptical, axial inlets 84 in the half 62 thereof. A fine sawdust collector bag 83 is suitably attached to the outlet 82 as by a drawstring. The inlets 84 are surrounded by elliptical projecting flanges or collars 86 for attachment thereon of one end of flexible conduits 91 and 93. The opposite end of conduit 91 is connected to a portion 90 integral with the hinged saw guard 38.

Referring to FIG. 16, the circular impeller 78 has a plurality of blades 79 angularly spaced about its axis of rotation which extend axially substantially between the casing walls 65 and 67 of the blower casing. Inner portions of the front edges of blades 79 adjacent the casing wall 65 are cut back as indicated at 75 to provide ample clearance to permit passage through the blower of any large pieces of the material being sawed which may enter the blower through inlets 84.

In order to provide optimum closure of the rear side of base 14 a baffle plate 92 shown alone in FIG. 7 is attached to the swinging member 28 by screws 40 and is positioned between the member 28 and the saw guard mounting bracket 36, see FIGS. 2 and 4. Baffle plate 92 has a cutout 94 therein shaped to slip over a lower projecting portion 26 of the member 28, a vertically elongated cutout 96 therein for passage of the saw driving belt 71 and an elliptical cutout 98 therein which receives the other end portion of flexible conduit 93. Overlying the lower and left hand side portions of baffle plate 92 and extending leftward to the left sidewall of base 13 and upward to the worktable is a sheet of thick, easily compressible foam rubber-like material 100, see FIG. 3.

The arcuate slot 102 in the front sidewall of the saw base, see FIGS. 5 and 6, which is conventionally provided in the front wall of base 14 to permit swinging of the saw elevating screw 104 when the saw blade is tilted, is closed with a strip of easily compressible foam rubber-like material 103 attached to the sidewall by clips 106. Other openings such as between the saw base and table are preferably sealed with strips of foam rubber-like material.

The flexible conduits 91 and 93 are preferably round and corrugated and constructed of a relatively soft rubber-like material so as to flex easily without undue distortion as the front end of hinged saw guard 38 is raised or the baffle plate 92 is swung to the left when adjusting the saw blade to a bevel position. The opening 98 in the baffle plate 92, the inlets 84 and the collars 86 surrounding them in the blower housing are elliptical with relatively large major diameters and relatively small minor diameters so that to enter the opening 98 or to be slipped over the collars 86 the round rubber-like conduits are substantially distorted which retains them in connected position. Additionally, the collars 86 and the connecting portion 90 of the saw blade guard 38 are provided with conduit retention protrusions 108 and 110 respectively. Referring to FIG. 1, the conduit 91 is supported in an elevated position above the worktable on a bracket 112.

The capacity of centrifugal blower 48 and the diameters of flexible conduits 91 and 93 are such as to cause a relatively large volume of air to flow through the saw guard and base at a relatively slow rate so as to collect virtually all of the fine sawdust particles likely to become airborne without withdrawing any appreciable amount of larger, heavier particles which are directed or fall into collector bag 18 by gravity. Modifications of the illustrated embodiment within the spirit of the invention, as required for adaptation to other power saws will occur to those familiar with the art and problem and the exclusive use of all such modifications is contemplated.

We claim:

1. Sawdust collection apparatus for a belt driven table saw having a horizontal worktable, a saw blade, an open bottom base below the worktable enclosing saw blade tilting and elevating mechanism, means supporting the base from a floor, and a saw blade driving motor mounted outboard from the base; the apparatus including a collector bag detachably connected to and enclosing said base bottom for collecting the larger heavier sawdust particles directed downwardly by said blade, a centrifugal blower driven by said motor and including a casing having an inlet and an outlet, conduit means connecting the interior of said base with said blower inlet and a fine sawdust collector bag detachably connected to said outlet and said blower and connecting conduit having a capacity limited to that which will withdraw from said base substantially only those fine sawdust particles likely to become airborne.

2. Sawdust collection apparatus for a belt driven table saw having a horizontal worktable, a saw blade, a hinged saw guard resting on said table, a base below the table having an open bottom and one open side and partially enclosing saw blade tilting and elevating mechanism, and a saw driving motor positioned outboard of the open side of said base and attached to said mechanism for movement with the saw blade; the apparatus including a collector bag detachably connected to and enclosing the open bottom of said base, means movable with said motor substantially closing the open side of said base, a centrifugal blower mounted outboard of said base and driven by said motor, said blower including a casing having two inlets and an outlet, a first flexible conduit connecting said saw guard with one of said inlets, a second flexible conduit connecting the interior of said base with the other of said inlets and a collector bag detachably connected to said outlet.

3. The sawdust collection apparatus claimed in claim 2 in which the capacity of said blower and said connecting conduits causes an airflow rate through said saw guard and said base sufficient only to withdraw the finer, lighter sawdust particles therefrom.

4. The sawdust collection apparatus claimed in claim 2 in which said blower casing is attached to one end of said motor and in which an impeller within said blower casing is connected to the output shaft of said motor.

5. The sawdust collection apparatus claimed in claim 2 in which the table saw further includes a belt pulley attached to one end of the output shaft of the driving motor, in which said blower casing is attached to said one end of said motor and spaced axially outward from said pulley and has an impeller therein connected to said one end of said output shaft, and in which said casing has an integral skirt extending axially over said belt pulley and forming a guard therefor.

6. The sawdust apparatus claimed in claim 2 in which said means substantially enclosing said open side of said base includes a baffle plate connected to said mechanism and movable with said motor and forming a partial enclosure, in which an end portion of said second flexible conduit is extended through an aperture in said baffle plate into the interior of said base, and in which a sheet of easily compressible foam rubber-like material substantially completes the closure of said open side of said base.

7. The sawdust collection apparatus claimed in claim 2 in which said flexible conduits are round in cross section, formed with corrugations to maintain shape when bending and constructed of a relatively soft rubber-like material.

8. The sawdust collection apparatus claimed in claim 2 in which said casing inlets are elliptical and are provided with elliptical collars, in which said flexible conduits are round in cross section and constructed of soft rubber-like material and are distorted sufficiently when stretched over said elliptical collars to retain them in position.

9. The sawdust collection system claimed in claim 5 which further includes pieces of easily compressible foam rubber-like material closing other openings in said base.

10. A table saw having a horizontal worktable, a hinged saw guard resting on said table, an open bottom base below said table enclosing saw blade tilting and elevating mechanism, a saw driving motor and means supporting said base in spaced relationship from a floor, a sawdust collector bag detachably connected to and enclosing said open base bottom, a centrifugal blower mounted outboard of said base and driven by said motor, said blower including a casing having a pair of axial inlets and an outlet, a first flexible conduit connecting the interior of said saw guard with one of said inlets, a second flexible conduit connecting the interior of said base with the other of said inlets and a second collector bag detachably connected to said outlet.

11. The table saw claimed in claim 10 in which said blower and said connecting conduit means causes an airflow rate through said saw guard and said base limited to that which will cause the withdrawal of substantially only the finer, lighter particles from said saw guard and said base.

12. The table saw claimed in claim 10 in which said blower casing has front and rear walls and connecting sidewall and has a circular impeller therein mounted for rotation in said rear wall, in which said axial inlets are formed in said front wall and positioned closely adjacent the axis of rotation of said impeller, in which said impeller includes a plurality of angularly spaced blades extending radially from its axis of rotation and axially between said front and rear walls, and in which an inner portion of each blade adjacent the axis of rotation is cut back so as to provide a space between said front wall and said blades to permit the passage of large particles which may be drawn into the blower.

13. Sawdust collection apparatus for a table saw having a frame, a horizontal worktable supported on said frame, a saw blade, an enclosure below said worktable, a hinged saw guard resting on said worktable and shrouding the projecting portion of said saw blade and a saw driving motor supported on said frame; the apparatus including a centrifugal blower driven by said motor, said blower having a pair of inlets and an outlet, a flexible conduit connecting said saw guard with one of said inlets, a conduit connecting said enclosure with the other of said inlets, and a sawdust collection bag connected to said outlet.

14. A power saw having a stationary support structure, a horizontal worktable, a saw arranged to saw workpieces on said worktable, and a saw driving motor mounted on said support structure, a centrifugal blower mounted on said support structure and driven by said motor, said blower including a casing having a pair of inlets and an outlet, means mounted above said worktable receiving sawdust during operation of the saw and an enclosure below said worktable receiving sawdust during operation of the saw, a flexible conduit connecting said means mounted above said table with one of said inlets, a second conduit connecting said enclosure with the other of said inlets and a sawdust collector bag connected to said outlet.

* * * * *